United States Patent
Shenkar et al.

(10) Patent No.: US 9,562,971 B2
(45) Date of Patent: Feb. 7, 2017

(54) POINT-CLOUD FUSION

(71) Applicant: GEOSIM SYSTEMS LTD., Petach Tikva (IL)

(72) Inventors: Victor Shenkar, Ramat Gan (IL); Yigal Eilam, Kiriat Ono (IL)

(73) Assignee: GEOSIM SYSTEMS LTD., Petach Tikva (IL)

( * ) Notice: Subject to any disclaimer, the term of this patent is extended or adjusted under 35 U.S.C. 154(b) by 41 days.

(21) Appl. No.: 14/646,394

(22) PCT Filed: Nov. 18, 2013

(86) PCT No.: PCT/IB2013/060209
§ 371 (c)(1),
(2) Date: May 21, 2015

(87) PCT Pub. No.: WO2014/080330
PCT Pub. Date: May 30, 2014

(65) Prior Publication Data
US 2015/0323672 A1 Nov. 12, 2015

Related U.S. Application Data

(60) Provisional application No. 61/729,359, filed on Nov. 22, 2012.

(51) Int. Cl.
*G06K 9/00* (2006.01)
*G01S 17/02* (2006.01)
*G01S 17/87* (2006.01)
*G01S 17/89* (2006.01)
*G06T 17/05* (2011.01)
*G01C 15/00* (2006.01)
*G01S 7/48* (2006.01)

(52) U.S. Cl.
CPC ........... *G01S 17/023* (2013.01); *G01C 15/002* (2013.01); *G01S 7/4808* (2013.01); *G01S 17/87* (2013.01); *G01S 17/89* (2013.01); *G06T 17/05* (2013.01); *G06T 2210/56* (2013.01)

(58) Field of Classification Search
CPC ..... G01S 17/023; G06T 17/05; G06T 2210/56
USPC .................................................. 345/419, 653
See application file for complete search history.

(56) References Cited

U.S. PATENT DOCUMENTS 7,184,890 B2 * 2/2007 Boright ................ G06K 9/0063
702/3
7,417,717 B2 * 8/2008 Pack ........................ G01C 7/04
356/4.01

(Continued)

*Primary Examiner* — Yosef Kassa
(74) *Attorney, Agent, or Firm* — Daniel J. Swirsky; AlphaPatent Associates Ltd.

(57) ABSTRACT

A method and a system for creating a collective point-cloud data from a plurality of local point-cloud data including the steps of: providing scanner data containing a plurality of local point-cloud data and relatively low-precision positioning data of the scanner providing the local point-cloud data, creating a relatively medium-precision collective point-cloud data from the plurality of local point-cloud data using external (medium-precision) positioning data associated with each of said plurality of local point-cloud data, and then creating a relatively high-precision collective point-cloud data from said medium-precision collective point-cloud data.

29 Claims, 13 Drawing Sheets

(56) References Cited

U.S. PATENT DOCUMENTS

| | | | | |
|---|---|---|---|---|
| 7,752,483 B1 * | 7/2010 | Muresan | ............... | G01S 17/023 386/207 |
| 8,456,471 B2 * | 6/2013 | Wallace | ................. | G06T 15/30 345/427 |
| 8,566,615 B2 * | 10/2013 | Balinsky | ............... | H04L 9/0866 380/277 |
| 8,682,586 B1 * | 3/2014 | Selman | ................... | G01V 1/40 702/9 |

* cited by examiner

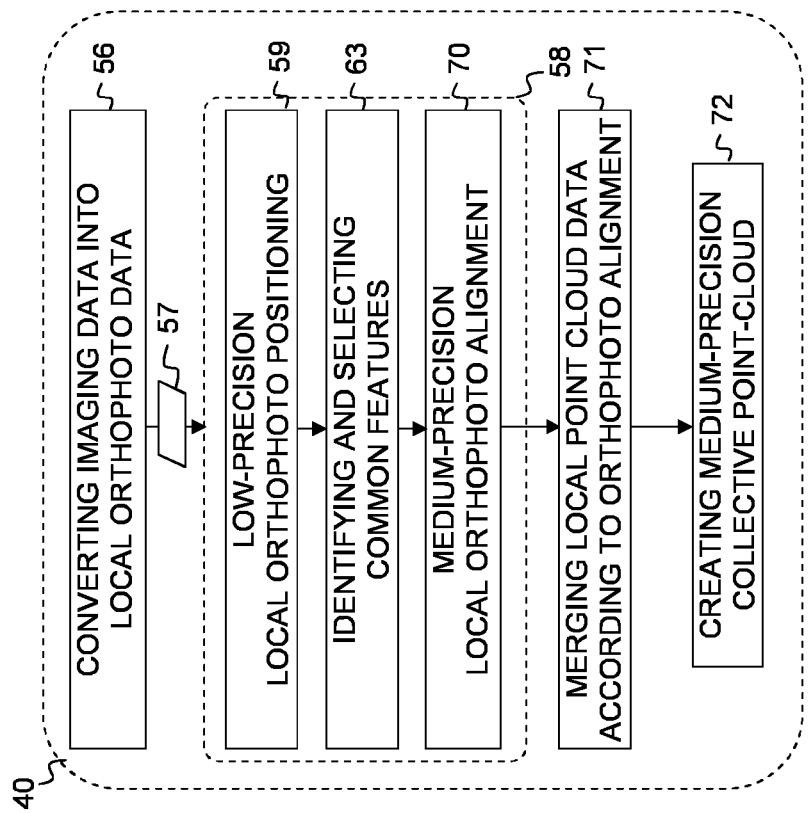
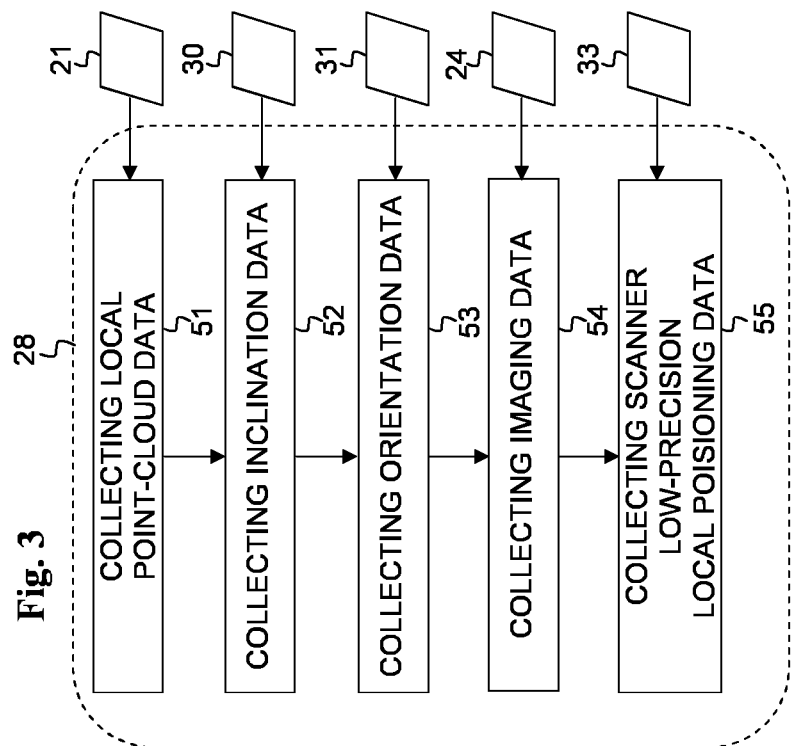

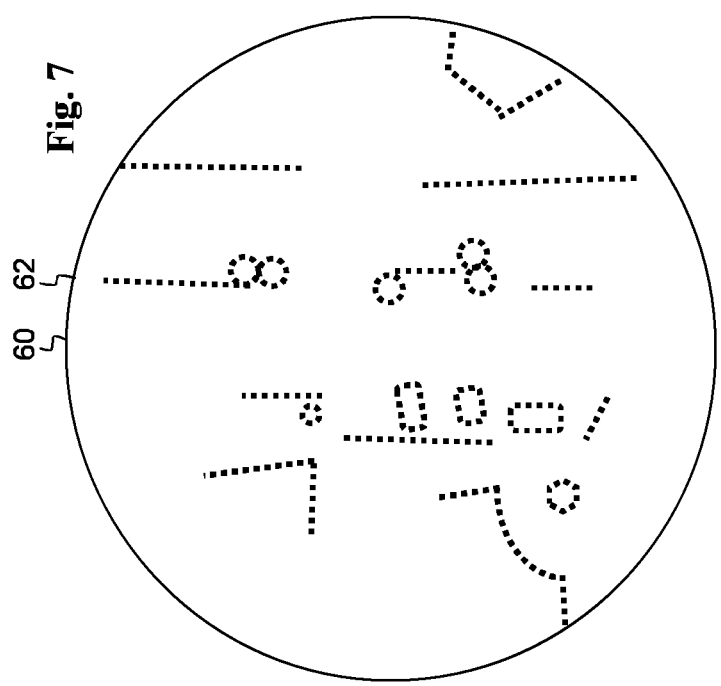
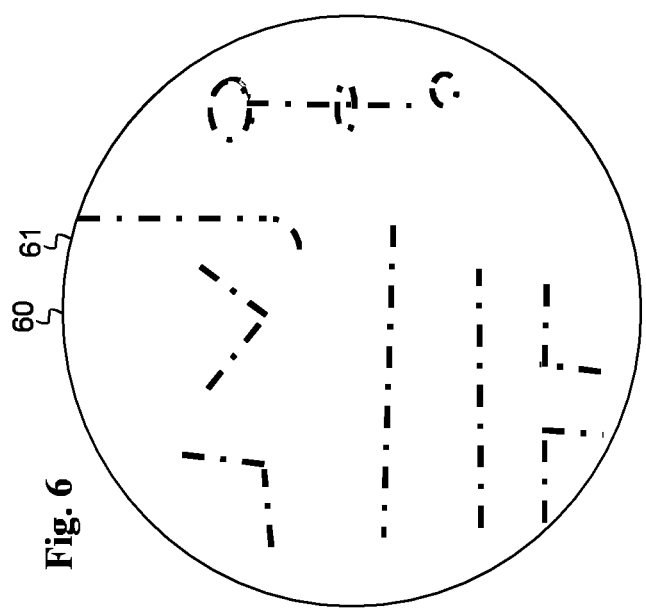

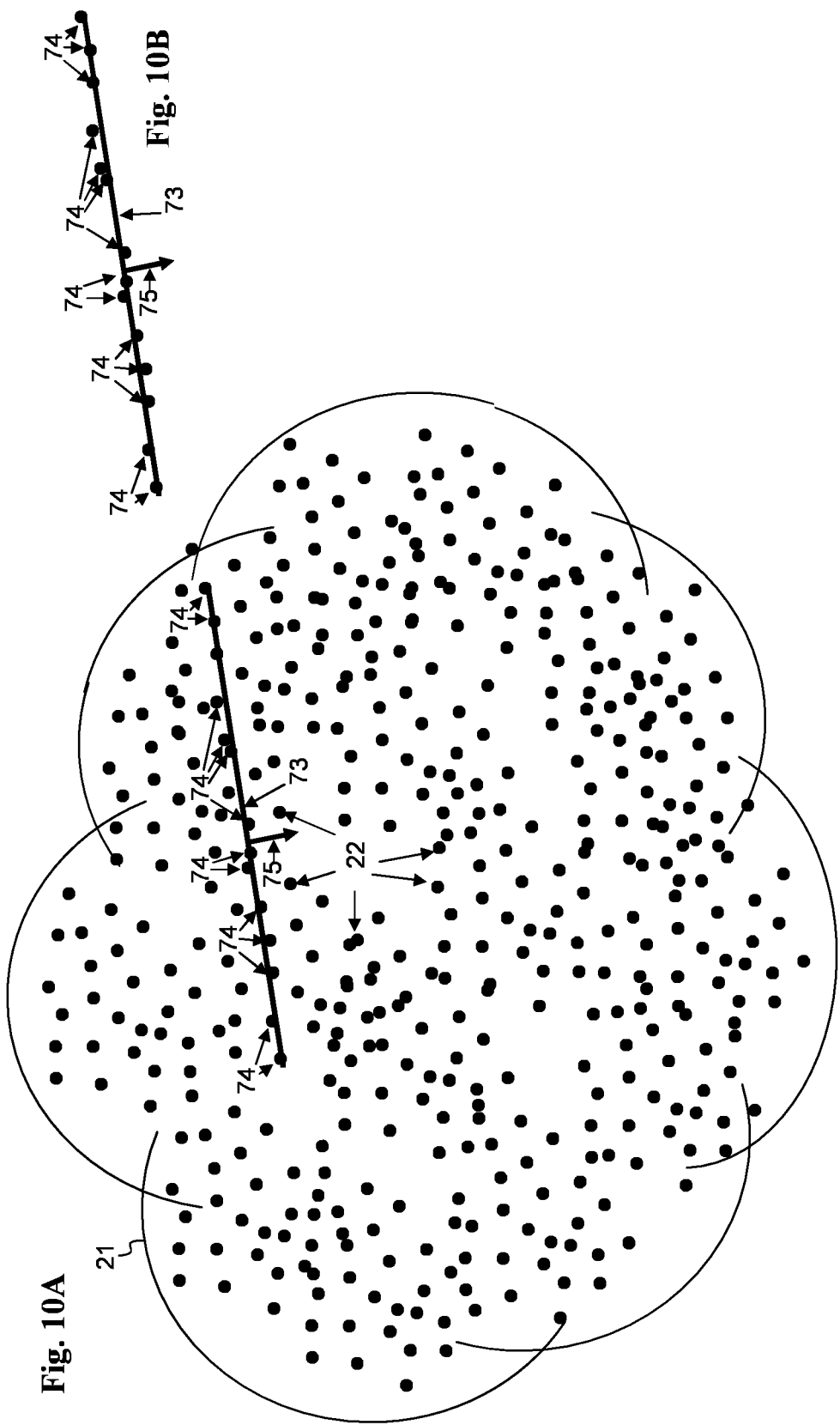

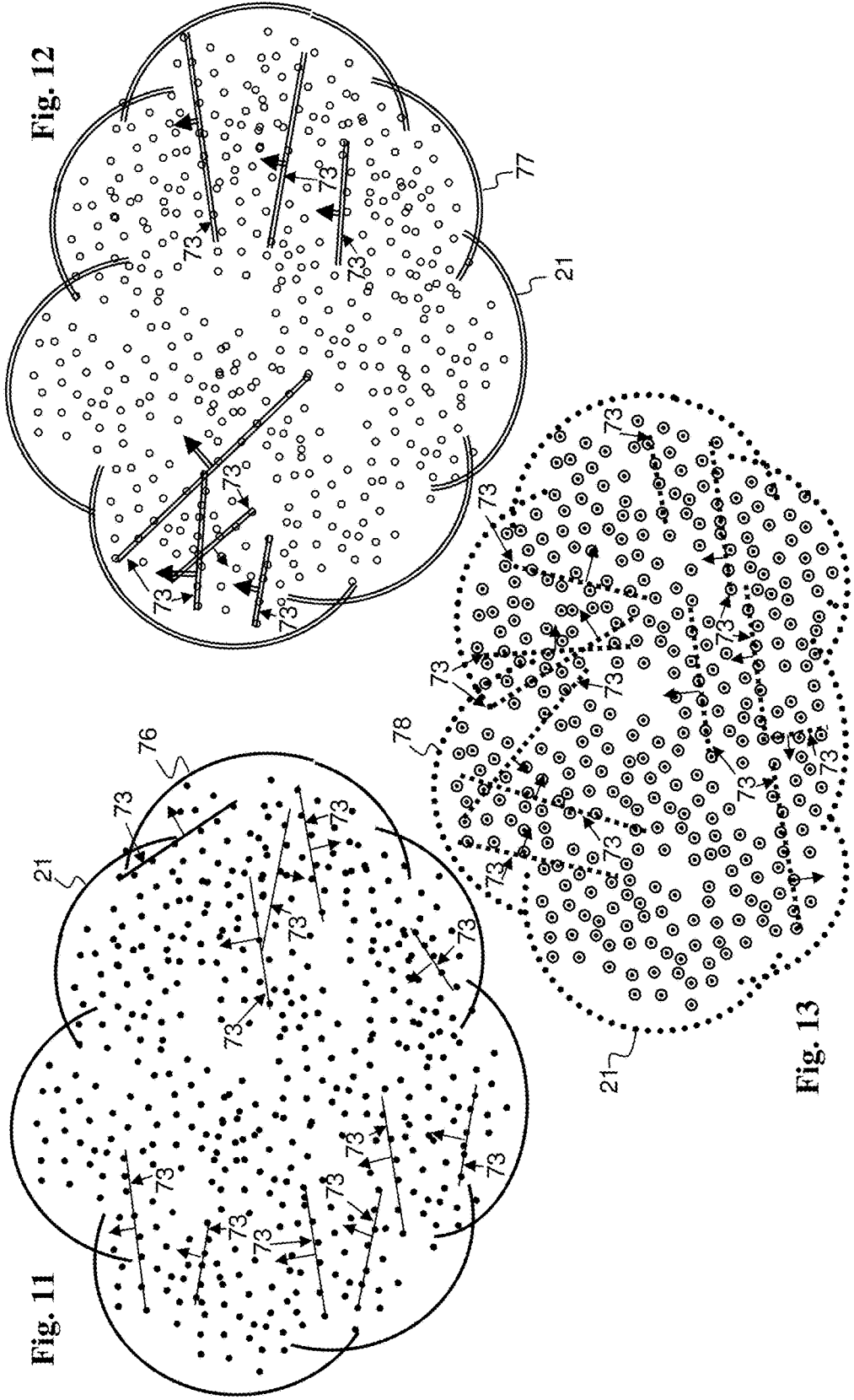

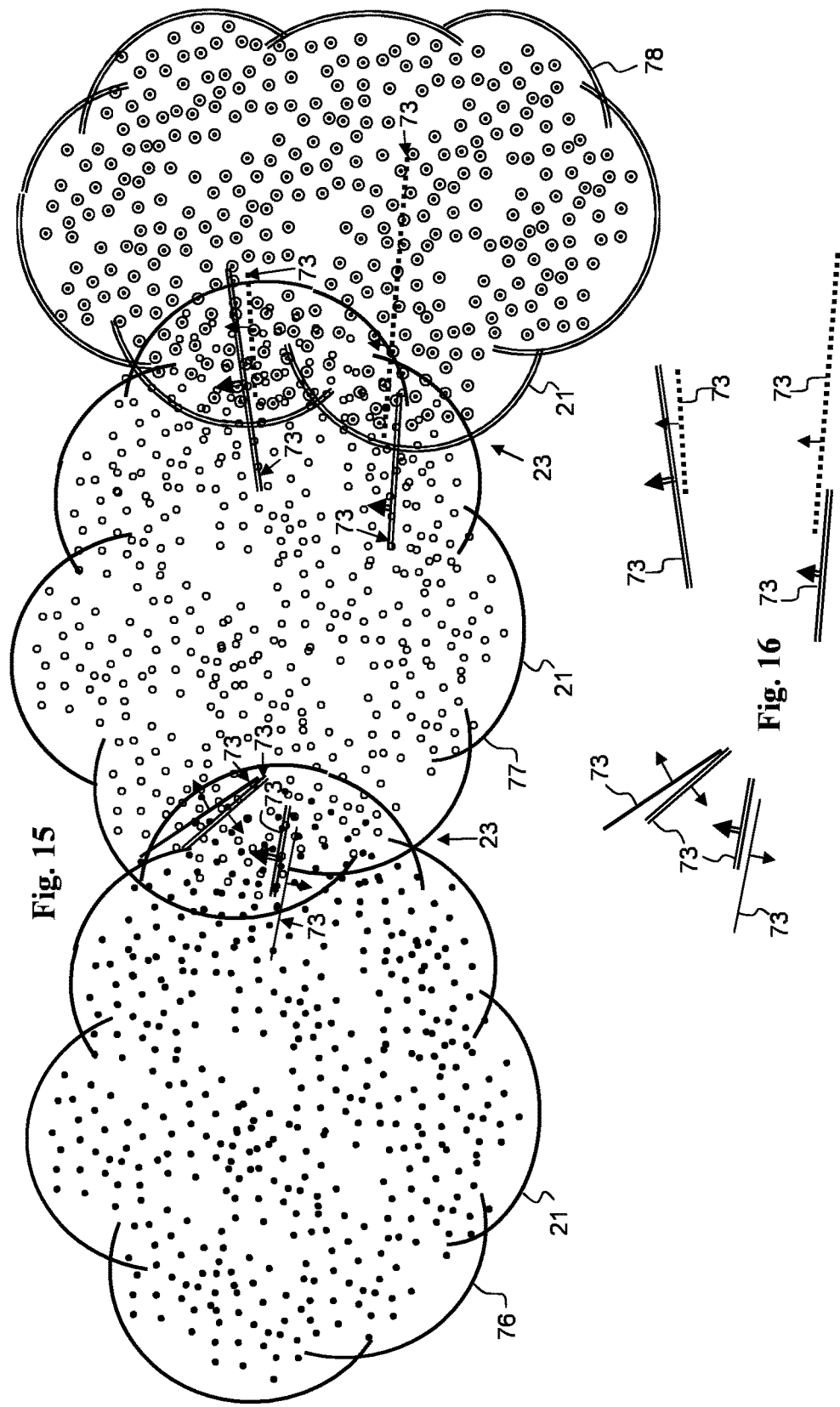

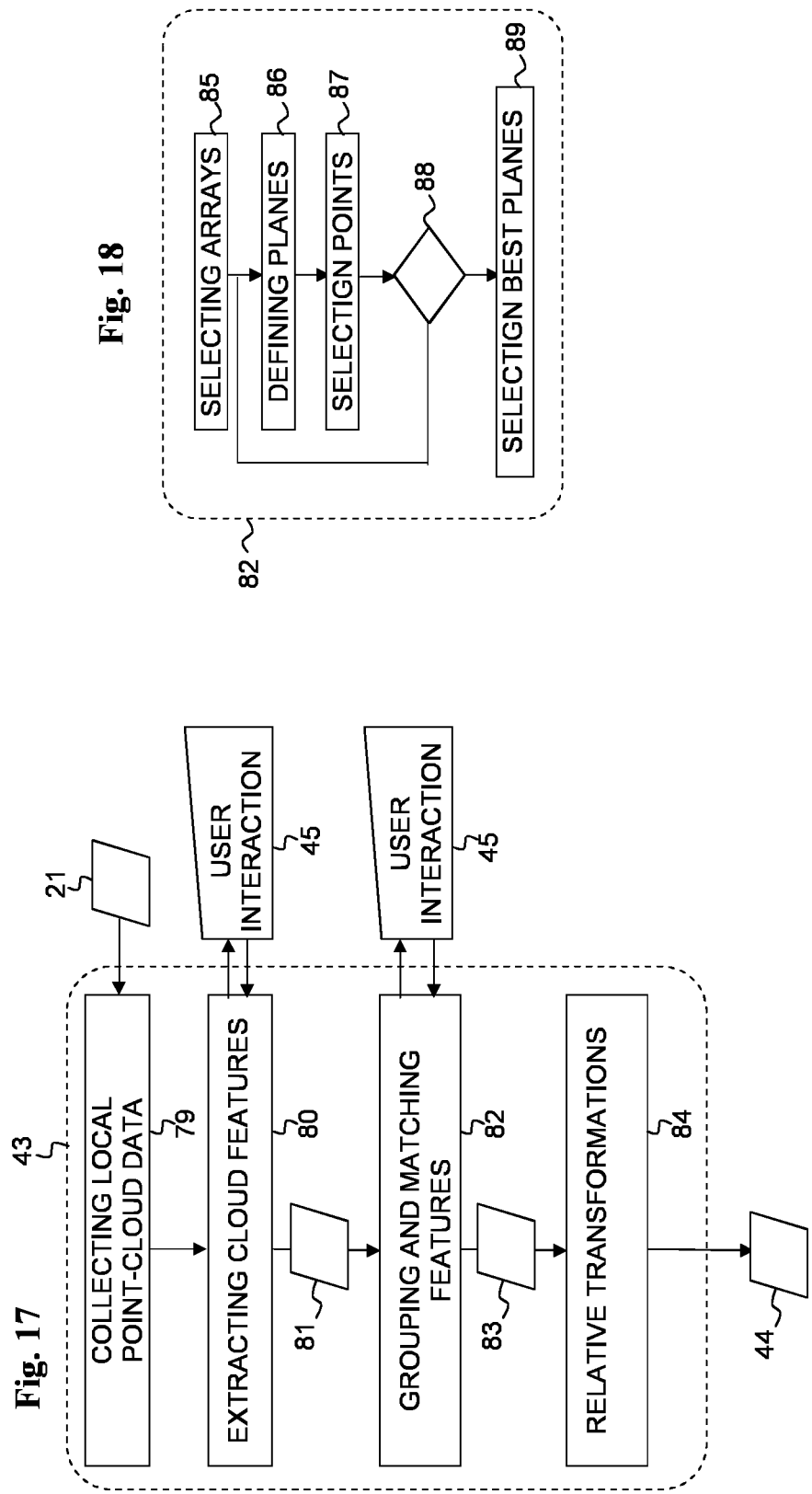

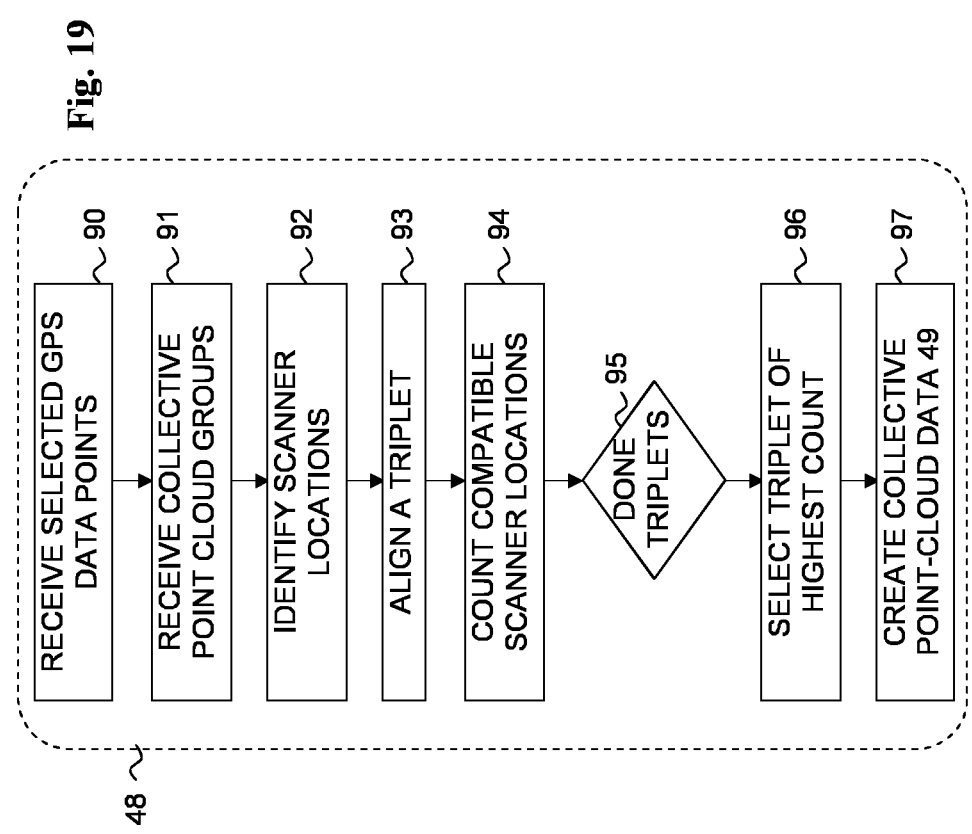

POINT-CLOUD FUSION

CROSS-REFERENCE TO RELATED APPLICATIONS

This application is a U.S. National Phase Application under 35 U.S.C. 371 of International Application No. PCT/IB2013/060209, which has an international filing date of Nov. 18, 2013, and which claims the benefit of priority from U.S. Provisional Patent Application No. 61/729,359, filed on Nov. 22, 2012, which is incorporated herein by reference.

FIELD OF THE INVENTION

The present invention relates to creating a three dimensional model of a large physical entity and, more particularly, but not exclusively to fusing together a plurality of three dimensional point clouds representing a large physical entity.

BACKGROUND OF THE INVENTION

It is well known in the art to produce a three-dimensional (3D) point-cloud model of a physical entity. Such point-cloud can be produced by a probing device, which probes the surface of a physical object. Such probing can be tactile, optical, electro-magnetic, etc. The 3-D probing machine, namely a scanner, and typically a laser-scanner, creates a set of 3D points, namely a point-cloud, describing the shape and/or surface features of the object.

Creating a point-cloud for a large object or entity (these terms can be used in this documents interchangeably unless differentiated explicitly), such as a building or an urban environment, requires a large number of scans producing a large number of partial or local point-clouds, that have to be fused together to create a complete or global point-cloud of the entity. The terms object and entity, and the terms partial and local (with respect to point-cloud) can be used in this document interchangeably unless differentiated explicitly.

Typically, at least some of these scans require moving the scanner about the entity, therefore creating a problem of alignment of the plurality of local point-clouds to produce a complete and accurate global point-cloud.

Currently, the process of aligning local point-clouds is highly complex and requires massive processing power, human involvement, and time, and yet produces an imprecise global point-cloud.

There is thus a widely recognized need for, and it would be highly advantageous to have, a system and a method for fusing a plurality of local-point clouds into an accurate global point-cloud devoid of the above limitations.

SUMMARY OF THE INVENTION

According to one aspect of the present invention there is provided a method for creating a collective point-cloud data from a plurality of local point-cloud data, the method including the steps of: providing scanner data including the plurality of local point-cloud data, where the local point-cloud data includes relatively low-precision positioning data of the scanner, creating a relatively medium-precision collective point-cloud data from the plurality of local point-cloud data, and creating a relatively high-precision collective point-cloud data from the medium-precision collective point-cloud data, where the step of creating a medium-precision collective point-cloud data includes providing external (medium-precision) positioning data associated with each of the plurality of local point-cloud data.

According to another aspect of the present invention there is provided a method for creating a collective point-cloud data where the low-precision positioning data includes at least one of X, Y, Z coordinates, and yaw angle of a scanner providing the local point-cloud data, and where the step of creating a medium-precision collective point-cloud data includes obtaining medium-precision data for at least one of the x, y, z coordinates, and yaw angle of the local point-cloud data.

According to yet another aspect of the present invention there is provided a method for creating a collective point-cloud data where the external (medium-precision) positioning data includes digital elevation model (DEM) and where the step of calculating medium-precision z coordinate for any of the local point-cloud data includes using Z value from the DEM data.

According to still another aspect of the present invention there is provided a method for creating a collective point-cloud data where the step of calculating medium-precision for at least one of the x, y, z coordinates, and yaw angle includes: providing a global orthophoto data for the collective point-cloud data, providing a local orthophoto data for each of the local point-cloud data, aligning each of the local orthophoto data to the global orthophoto data to form a collectively-aligned local-orthophoto data, and calculating the medium-precision values for at least one of the X, Y, and yaw for at least one of the local-orthophoto data based on the alignment of the local point-cloud data to the global orthophoto data.

Further according to another aspect of the present invention there is provided a method for creating a collective point-cloud data where the step of providing the local orthophoto data includes the steps of: providing image data including of at least one of a ground image and a ceiling image, the image data associated with each of the local point-cloud data, and converting the image data into a local orthophoto data.

Yet further according to another aspect of the present invention there is provided a method for creating a collective point-cloud data where the step of aligning the local orthophoto data includes the steps of: providing inclination data to form roll and pitch values of the scanner providing the local point-cloud data for at least one of the local orthophoto data, and using the roll and pitch values as medium-precision values of at least one of the local orthophoto data and the local point-cloud.

Still further according to another aspect of the present invention there is provided a method for creating a collective point-cloud data where the step creating a medium-precision collective point-cloud data includes: providing a global orthophoto data for the collective point-cloud data, providing a local orthophoto data for the scanner when scanning the local point-cloud data, aligning each of the local orthophoto data to the global orthophoto data, and aligning the local point-cloud data, using the alignment of the local-orthophoto data to form the medium-precision collective point cloud data.

Even further according to another aspect of the present invention there is provided a method for creating a collective point-cloud data where the step of aligning the local orthophoto data includes the steps of obtaining a global digital elevation model (DEM) data associated with at least one of the global orthophoto and the collective point-cloud data, and obtaining z value from the DEM data for at least one of the global orthophoto data and the local-orthophoto data.

Additionally according to another aspect of the present invention there is provided a method for creating a collective point-cloud data where the step of aligning the local orthophoto data includes the steps of: providing inclination data to form roll and pitch values of the scanner providing the local point-cloud data for at least one of the local orthophoto data, and using the roll and pitch values as medium-precision values of at least one of the local orthophoto data and the local point-cloud.

According to yet another aspect of the present invention there is provided a method for creating a collective point-cloud data where the step of creating a high-precision collective point-cloud data includes: extracting at least one feature from a first local point-cloud, extracting at least one feature from a second local point-cloud, matching at least one feature of the first local point-cloud with at least one feature of the second local point-cloud, and applying a relative transformation including at least one of rotation and translation to at least one of the first and second local point-clouds to align the feature from the first local point-cloud with the feature from the second local point-cloud.

According to still another aspect of the present invention there is provided a method for creating a collective point-cloud data where at least one of the features is a planar patch.

Further according to another aspect of the present invention there is provided a method for creating a collective point-cloud data where the step of matching the features includes finding a group of features including at least one feature from the first local point-cloud and at least one feature from the second local point-clouds, and where the step of applying a relative transformation includes finding a relative transformation that minimizes distances between the features from the first local point-cloud in the group and the features in the second local point-clouds in the group.

Yet further according to another aspect of the present invention there is provided a method for creating a collective point-cloud data where the step of matching the features includes features that are close according to the medium-precision collective point-cloud data.

Still further according to another aspect of the present invention there is provided a method for creating a collective point-cloud data where the step of matching the features includes planar features that have a similar normal vector.

Even further according to another aspect of the present invention there is provided a method for creating a collective point-cloud data additionally including a step of geo-referencing the high-precision collective point-cloud data using relatively high-precision external positioning data.

Additionally according to another aspect of the present invention there is provided a method for creating a collective point-cloud data the step of geo-referencing includes: obtaining the high-precision external positioning data for each of a plurality of the local point-cloud data.

According to yet another aspect of the present invention there is provided a method for creating a collective point-cloud data where the high-precision external positioning data includes global positioning system (GPS) data.

According to still another aspect of the present invention there is provided a method for creating a collective point-cloud data where the step of geo-referencing includes: selecting at least one GPS data according to a criterion selected from a group of criterions including: GPS data including a predetermined minimal number of satellites, GPS data including a predetermined minimal uninterrupted reception time of a minimal number of satellites, and GPS data within a predetermined limit variance from an average of the GPS data.

Further according to another aspect of the present invention there is provided a computer program product, stored on one or more non-transitory computer-readable medium, including instructions operative to cause a programmable processor of a network device to perform the above method for creating a collective point-cloud data.

Yet further according to another aspect of the present invention there is provided a method for creating a collective point-cloud data including a plurality of local point-clouds, the method including the steps of: extracting at least one feature from a first local point-cloud, extracting at least one feature from a second local point-cloud, matching at least one feature of the first local point-cloud with at least one feature of the second local point-cloud, and affecting a relative transformation including at least one of rotation and translation on at least one of the first and second local point-clouds to align the feature from the first local point-cloud with the feature from the second local point-cloud.

Still further according to another aspect of the present invention there is provided a method for creating a collective point-cloud data where at least one of the features is a planar patch.

Even further according to another aspect of the present invention there is provided a method for creating a collective point-cloud data where the step of matching the features includes finding one or more groups of features, each including at least one feature from the first local point-cloud and at least one feature from the second local point-clouds, and where the step of affecting relative transformation includes finding relative transformation that minimizes distances between the features from the first local point-cloud in each of the group and the features in the second local point-clouds in each of the group.

Additionally according to another aspect of the present invention there is provided a method for creating a collective point-cloud data where the step of matching the features includes features that are close according to a medium-precision collective point-cloud data.

According to yet another aspect of the present invention there is provided a method for creating a collective point-cloud data where the step of matching the features includes: displaying the features to a user, and enabling the user to affect at least one of selection and de-selection of features.

According to still another aspect of the present invention there is provided a method for creating a collective point-cloud data where the step of enabling the user to affect at least one of selection and de-selection of features includes at least one of inclusion or removal of the features from the group.

Further according to another aspect of the present invention there is provided a method for creating a collective point-cloud data where the step of matching the features includes planar features that have a similar normal vector.

Yet further according to another aspect of the present invention there is provided a method for creating a collective point-cloud data where the step of matching the features includes: using a medium-precision collective point-cloud data, setting parameters for determining distance threshold between cloud features, displaying the features to a user, matching features that are close according to the distance threshold, and enabling the user to affect at least one of selection and de-selection of features.

Still further according to another aspect of the present invention there is provided a method for creating a collective point-cloud data additionally including the step of setting parameters for determining planar vector similarity, where the step of matching the features includes determining planar vector similarity according to the parameter, and enabling the user to affect at least one of selection and de-selection of features includes least one of inclusion or removal of the features from the group based on the vector similarity.

Even further according to another aspect of the present invention there is provided computer program product, stored on one or more non-transitory computer-readable medium, including instructions operative to cause a programmable processor of a network device to perform the steps described above.

Additionally according to another aspect of the present invention there is provided a method for geo-referencing a global point-cloud, the global point-cloud including a fused plurality of local point-clouds, the method including the steps of: providing the global point-cloud including a plurality of local point-clouds, where at least some of the local point-clouds are each associated with a geo-referencing measurement, thus forming a first plurality of geo-referencing measurements, selecting a second plurality of geo-referencing measurements from the first plurality of geo-referencing measurements, so that geo-referencing the global point-cloud according to the second plurality of geo-referencing measurement is best consistent with the first plurality of geo-referencing measurements, selecting a third plurality of geo-referencing measurements which includes the second plurality of geo-referencing measurements and possibly some other consistent geo-referencing measurements from the first plurality of geo-referencing measurements, geo-referencing measurements within a predetermined limit variance from an average of the second plurality of geo-referencing measurements, and geo-referencing the global point-cloud according to the third plurality of geo-referencing measurements.

Additionally according to yet another aspect of the present invention there is provided a method for geo-referencing a global point-cloud additionally including the step of determining consistency between the geo-referenced global point-cloud and the plurality of geo-referencing measurements according to a predetermined distance between a number of the geo-referencing measurements and their position according to the geo-referenced global point-cloud.

Additionally according to still another aspect of the present invention there is provided a method for geo-referencing a global point-cloud additionally including the method for creating a collective point-cloud data described above.

Further according to still another aspect of the present invention there is provided a method for geo-referencing a global point-cloud where the geo-referencing measurement includes a location measurement using a global positioning system (GPS).

Yet further according to still another aspect of the present invention there is provided a computer program product, stored on one or more non-transitory computer-readable medium, including instructions operative to cause a programmable processor to perform the above method for geo-referencing a global point-cloud.

Unless otherwise defined, all technical and scientific terms used herein have the same meaning as commonly understood by one of ordinary skill in the art to which this invention belongs. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 3 is a simplified block diagram of procedure 28 for collecting scanner data;

FIG. 4 is a simplified block diagram of procedure 40 for creating medium-precision collective point-cloud;

FIG. 6 and FIG. 7 are simplified illustrations of two local orthophotos converted from imaging data collected by a scanner;

FIG. 10A and FIG. 10B are simplified illustrations of a point cloud with a point cloud feature;

FIG. 11, FIG. 12, and FIG. 13 are simplified illustrations of three point clouds;

FIG. 15 is a simplified illustration of a high-precision alignment of the three point clouds;

FIG. 16 is a simplified illustration of selected point cloud features of the three point clouds;

FIG. 17 is a simplified block diagram of a software procedure for creating high-precision collective point-cloud data;

FIG. 18 is a simplified block diagram of a procedure for grouping and matching cloud features;

FIG. 19 is a simplified flow diagram of a procedure for creating geo-referenced high-precision collective point-cloud data; and FIG. 20 is a simplified block diagram of a process for optimizing a cost function.

DETAILED DESCRIPTION OF THE INVENTION

Figure 1:
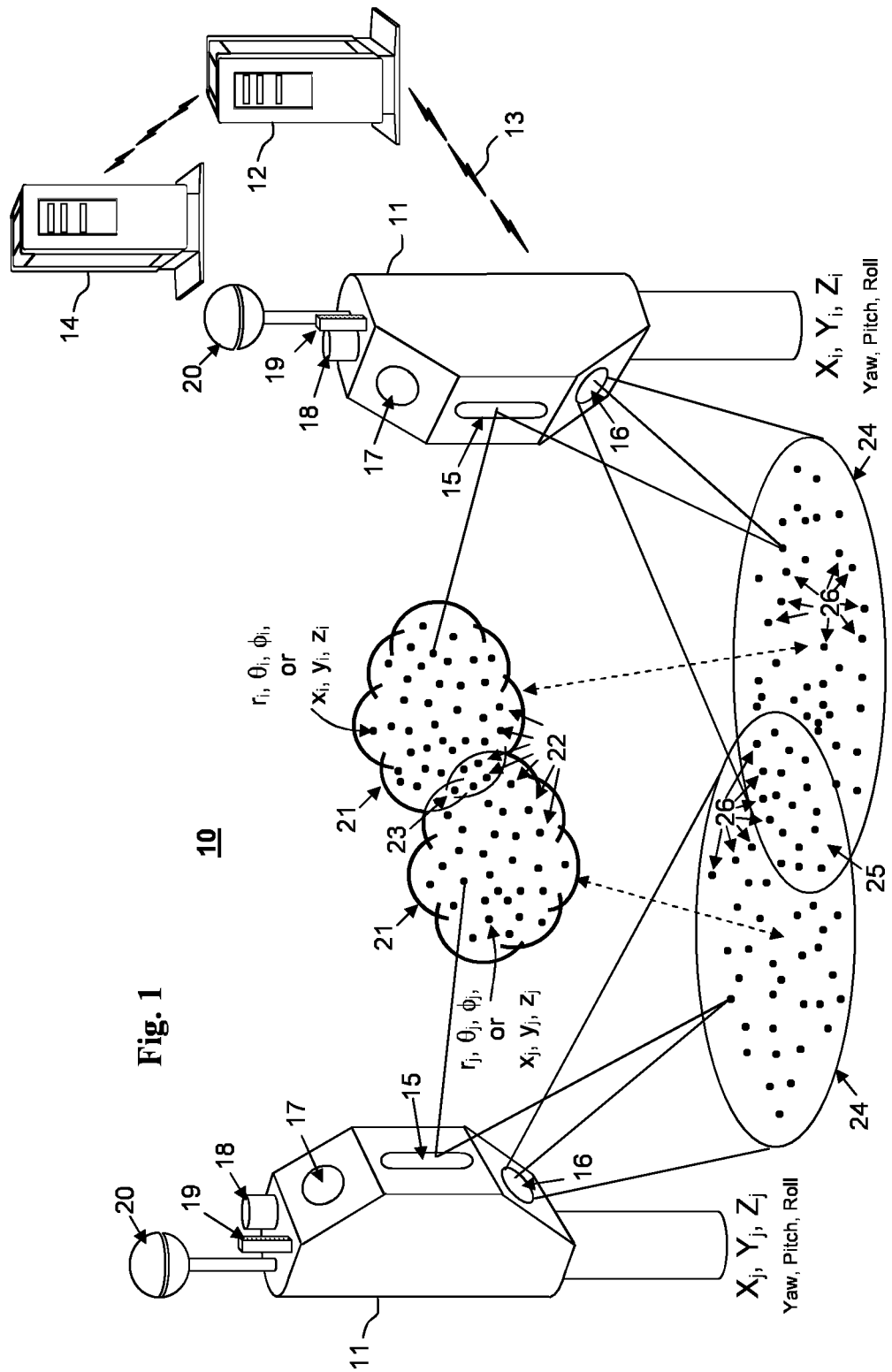
FIG. 1 is a simplified illustration of a scanning system for collecting a plurality of local point-clouds and producing a global point-cloud.

The present invention includes a system and a method for collecting a plurality of local point-clouds and producing a global point-cloud. The principles and operations of fusing a plurality of local point-clouds into a global point-cloud according to the present invention may be better understood with reference to the following drawings and accompanying description.

Before describing embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different Figs. may use different scales and different scales can be used even within the same drawing, for example different scales for different views of the same object or different scales for the two adjacent objects.

The purpose of the present invention is to provide a point-cloud of a physical entity or object. The entity or object can be any large physical object such as a building, a construction, a structure, an urban environment, etc. The point-cloud of the entire entity or object is named herein a global point-cloud, a fused point-cloud, a merged point-cloud, a collective point-cloud, etc. This global point-cloud is preferably created by fusing, merging, and/or aligning a plurality of partial or local point-clouds. These local point-clouds are preferably created or collected by a 3D scanner, preferably a 3D laser scanner. Laser scanners are well known in the art. Typically, the local point-clouds are created by moving the scanner about (such as around and/or within) the object or entity.

Other types of 3D scanners are also known and may be used by one or more embodiments of the present invention to create point-clouds. Such 3D scanners may use phase measurement laser scanner technology, structured-light 3D scanner using pattern projection technology, etc.

A laser scanner typically projects a pulsed laser beam on a predetermined measurement area, and receives reflected light. The direction and time of travel of the pulse light provides three-dimensional position data of the projecting point of the pulsed laser beam for each pulse. These three-dimensional point positions are called herein cloud-point data. A laser scanner enables measuring, or providing, or obtaining, or acquiring, or collecting, cloud-point data. These terms measuring, providing, obtaining, acquiring, collecting can be used in this document interchangeably when denoting the use of internal or external data such as point-cloud data.

The point-cloud data provided by the scanner usually contain relatively high-precision positioning data, typically including distance and angular data in polar coordinate, or, alternatively, x, y, and z coordinates of each point of the point-cloud. No matter how accurate is the point-cloud data it is relative data. It is relative to the scanner position. To provide absolute coordinates of these point positions their data has to be referenced to the absolute position of the scanner itself.

The scanner position is usually described by X, Y, Z coordinates and yaw, pitch and roll angles, any of which can be relatively low-precision data in comparison to the high precision relative data of the point clouds. The X, Y, and Z coordinates are usually referred to as position or location coordinates. Directing, aiming or orienting the scanner involves specifying the yaw, pitch and roll angles. These angles are according to Euler's rotation theorem and its derivations, where rotating the scanner together with an attached coordinate system S about its vertical Z-axis is referred to yaw, azimuth, orientation, or heading, and is denoted by $\alpha$. Further rotating the scanner together with S about S's newly rotated Y-axis is referred to pitch or elevation and is denoted by $\beta$. Further rotating the scanner about S's newly rotated X-axis is referred to roll or bank, and is denoted by $\gamma$. Practically, the X, Y, Z coordinates and yaw, roll and pitch angles refer to the scanner position or location with respect to the X, Y and Z axes. For simplicity, the $\alpha$, $\beta$, and $\gamma$ angles denote herein the direction of the scanner with respect to the X, Y and Z coordinates.

Typically, the X, Y, Z coordinates, and yaw angle are low-precision. Thus, by combining point-cloud data with the scanner position data and obtaining the geo-referenced point-cloud position data (x, y, z) is of low-precision. The term geo-referenced refers to expressing the point cloud positioning data with respect to the world geodetic system.

Reference is now made to FIG. 1, which is a simplified illustration of scanning system 10 for collecting a plurality of local point-clouds and producing a global point-cloud according to an embodiment of the present invention.

The scanning system 10 preferably includes one or more scanners 11 and a computing machine 12, such as a computer or a server. The terms computer and server can be used herein interchangeably with reference to computing machine 12. Computing machine 12 preferably includes: at least one processor, at least one memory device and/or storage device, at least one communication unit, and at least one user interaction interface such as display, keyboard, pointing device, etc.

The two scanners 11 shown in FIG. 1 can be two different scanners 11 or the same scanner 11 moved and placed at two locations. The computer 12 can be a part of the scanner, or co-located with the scanner 11, or can be located remotely. Thus, the scanner 11 and the computer 12 can communicate via a communication medium 13 that can be any type of communication network such as wired or wireless, PAN, LAN, MAN or WAN. It is appreciated that computer 12 can represent a plurality of computers, some of which are co-located with scanners 11 and others are positioned remotely, or operative in the form of cloud computing, etc.

Computer 12 is operative to receive external data by communicating with an external computing machine 14 or by means of a portable storage device, or any similar means for transporting data. The external computing machine 14 may be referred herein as external computer or external server or external data source. The external computing machine 14 may not be a part of the scanning system 10. Preferably, the external data includes global orthophoto data and digital elevation model (DEM) data.

The scanner 11 preferably includes:
A laser scanner 15.
Optionally, a camera 16, preferably directed for taking pictures of the ground near the scanner 11. Optionally, the laser scanner may be used additionally as camera 16.

Optionally, a camera 17, preferably directed for taking pictures above the scanner 11. Optionally, the laser scanner may be used additionally as camera 17.

Optionally, one or more route tracking devices (not shown), such as wheel encoders, to provide measurement of the distance traveled by the scanner, such as between neighboring scanning locations.

Optionally, a heading sensor or indicator 18, such as a magnetic compass, a gyro-compass, a solid-state compass, a digital compass, or a similar sensor for measuring yaw angle of the scanner 11. Heading can also be measured or assessed using route tracking devices and methods.

An orientation measuring unit 19 such as an inertial measuring unit (IMU), or an inclinometer, or similar device for measuring roll and pitch angles of the scanner 11.

A global positioning system (GPS) receiver 20 or a similar device for measuring the X, Y, and optionally also the Z coordinates of the scanner 11.

As shown in FIG. 1, the laser scanner 15 is operative to scan one or more physical objects in front of the scanner 11 thus creating point cloud data 21 of the surface of the scanned physical objects. A point cloud 21 is thus a collection of laser-scan points 22.

A group of scanners 11, or a scanner 11 moved about scenery such as an urban environment or an architectural structure, preferably creates a plurality of point clouds 21. Preferably, the point clouds 21 have some overlapping volumes 23. As shown in FIG. 1, a pair of point clouds 21 has an overlapping, or shared, volume 23.

As shown in FIG. 1, the camera 16 is operative to take pictures of the ground near the scanner 11, thus creating imaging data 24 of the surface of the ground near the scanner 11. Therefore, the group of scanners 11, or a scanner 11 moved about scenery such as an urban environment or an architectural structure, preferably creates a plurality of imaging data 24. Preferably, the imaging data 24 have some overlapping areas 25. As shown in FIG. 1, a pair of imaging data 24 has an overlapping, or shared, area 25. Preferably, imaging data 24 and point clouds 21 are taken simultaneously so that each imaging data 24 is associated with a point cloud 21. Therefore, overlapping volumes 23 are preferably associated with respective shared areas 25.

Camera 17 is operative to take pictures of the scenery above the scanner 11, such as exterior or interior details of a building or any other structure for which point clouds are collected.

As shown in FIG. 1, laser scanner 15 is additionally, optionally, but preferably, operative to collect or measure scan point data 26 of the ground details captured in the pictures taken by camera 17 (lower scan), or scan point data of the ceiling details captured in the pictures taken by camera 18 (upper scan).

It is appreciated that any or all of scanner 11 and computer 12, as well as external computer 14, preferably includes at least one processor for executing a software program and a storage device for storing a software program and/or data.

Preferably, scanner 11 and/or computer 12, and/or the software program associates each of the point data 26 (lower scan) with the corresponding pixels in the pictures of taken by camera 17, or point data (upper scan) with the corresponding pixels in the pictures of the ceiling taken by camera 18 to make the associated imaging data 24.

It is appreciated that point clouds 21 as drawn in this document represent a two-dimensional flattened view of a three dimensional point clouds 21.

Figure 2:
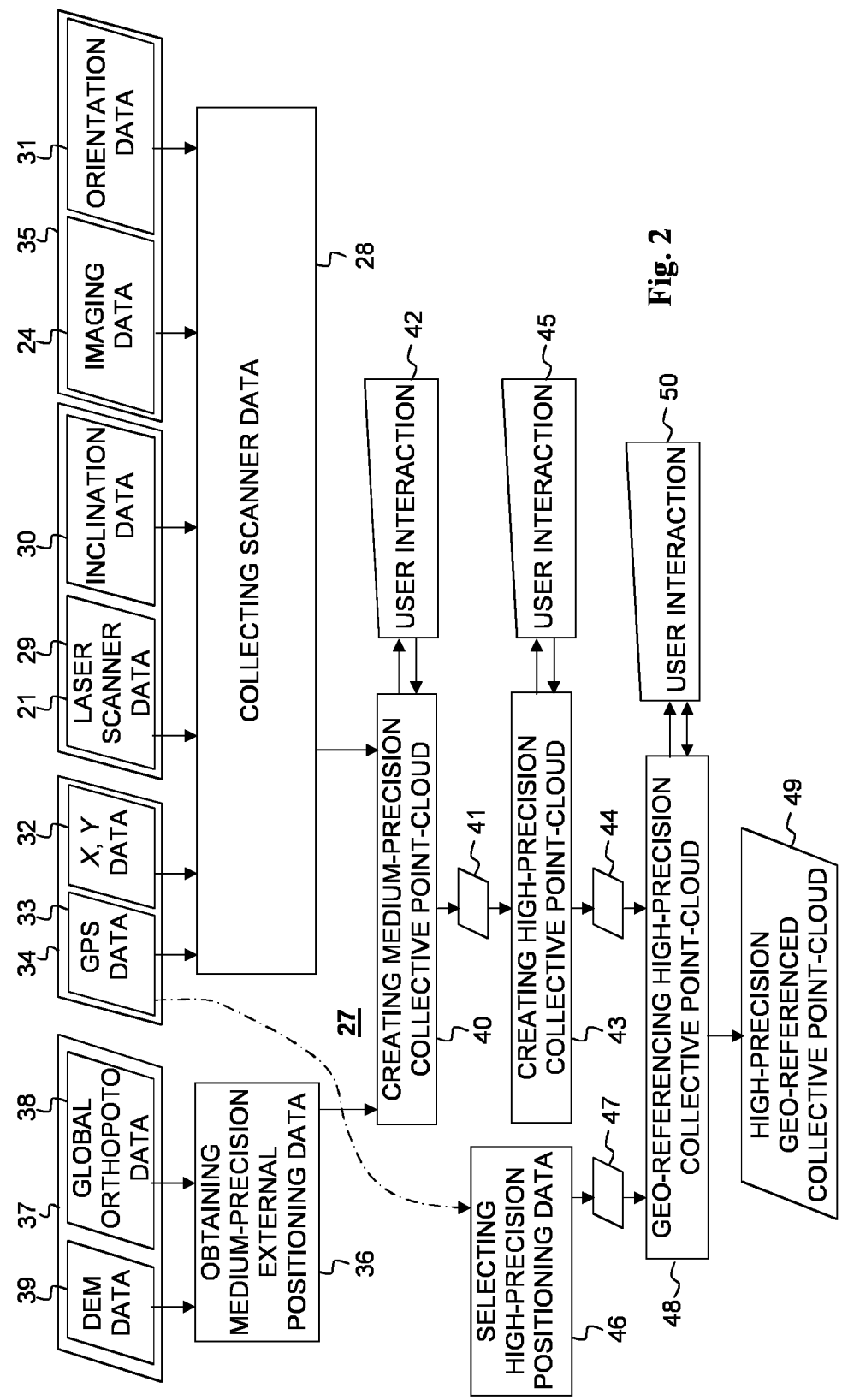
FIG. 2 is a simplified block diagram of a software program executed by one or more processors of scanning system.

Reference is now made to FIG. 2, which is a simplified block diagram of software program 27 executed by one or more processors of scanning system 10, according to an embodiment of the present invention.

Software program 27 can be executed by either or both the processors of scanner 11 and computer 12.

As shown in FIG. 2, software program 25 preferably operates as follows:

Procedure 28 of software program 27 preferably collects scanner data including:

Laser scanner data 29 including point clouds 21 produced by laser scanner 15.

Inclination data 30 produced by orientation measuring unit 19.

Orientation (heading) data 31 produced by heading indicator 18 or by other methods such as route tracking.

Imaging data 24 produced by camera 16.

Traveling distance data 32 of the scanner motion.

GPS data 33 produced by GPS receiver 20.

For the purpose of executing software program 27, the laser scanner data 29 and the inclination data 30 are considered high-precision data, however this data is referenced to scanner positioning data 34 that is considered low-precision data. Scanner positioning data 34 is typically the X and Y data 33 typically produced by route tracking device. GPS data 33 may also be considered low-precision data because in urban environment most of GPS data obtained by the GPS receiver is inaccurate, although certain subsets of the GPS data are high-precision positioning data. The scanner orientation data 31 and the imaging data 24 are considered (internal) medium-precision data 35.

Procedure 36 of software program 27 preferably collects external medium-precision positioning data 37 such as global-orthophoto data 38 of the environment scanned by scanner 11, and digital elevation model (DEM) data 39 associated with the global-orthophoto data 38. Procedure 36 is preferably executed by server 12 collecting the external medium-precision positioning data 37 from external data source 14. It is appreciated that the term collecting includes obtaining or providing external medium-precision positioning data 37 to server 12 or to procedure 36 as appropriate with the selected computing architecture. It is appreciated that the order of the steps executed with reference to, or by, procedures 28 and 36 may vary.

Software program 27 then preferably proceeds to procedure 40 to create medium-precision collective point-cloud data 41. Optionally, the creation of the medium-precision collective point-cloud data 41 requires user interaction 42 in the process executed by procedure 40. The process of creating medium-precision collective point-cloud data 41 is further detailed below.

Software program 27 then preferably proceeds to procedure 43 to create high-precision collective point-cloud data 44. Optionally, the creation of the high-precision collective point-cloud data 41 requires user interaction 45 in the process executed by procedure 43. The process of creating high-precision collective point-cloud data 44 is further detailed below.

Software program 27 then preferably proceeds to procedure 46 to select high-precision positioning data 47. The high-precision positioning data 47 is preferably selected from the scanner GPS positioning data 33, preferably produced by GPS receiver 20. As explained above, the scanner positioning data 33 is assumed low-precision as some of it is inaccurate. As further described below, procedure 46 preferably evaluates individual measurements consisting of scanner positioning data 33 and selects those measurements that appear to be high-precision positioning data 47.

The process of selecting high-precision positioning data 47 preferably relies on the quality of the GPS measurement as provided by the GPS post processing software. Typically, the GPS post processing software provides an estimate of the accuracy of the GPS positioning value as measured. The accuracy is usually expressed by a few quantifiers and usually one of them is in units of distance, e.g. meters. Procedure 46 preferably receives a predetermined threshold value, preferably discards GPS measurements whose accuracy are incompatible with the threshold value, and/or selects GPS measurements whose accuracy falls within the threshold value. For example, the threshold value is set to 0.15 meters, and procedure 46 selects only those GPS measurements for which the post processing software indicated estimated accuracy of 0.15 meters or less (higher accuracy). It is noted that for urban environments the accuracy estimate of the post processing software is frequently wrong, so that a large percent of the selected GPS measurements are actually inaccurate with respect to the required threshold.

Software program 27 then preferably proceeds to procedure 48 to create geo-referenced high-precision collective point-cloud data 49. Procedure 48 preferably locks or links or associates the high-precision collective point-cloud data 45 to the high-precision positioning data 47 so that the collective point-cloud becomes geo-referenced in respect to a particular geodetic system (e.g. the world geodetic system). Optionally, the creation of geo-referenced high-precision collective point-cloud data 49 requires user interaction 50 in the process executed by procedure 48. The process of creating geo-referenced high-precision collective point-cloud data 49 is further detailed below.

It is therefore appreciated that software program 27 creates a collective point-cloud data 44 from a plurality of local point-cloud data 21 by executing the following steps:
  Obtaining scanner data, containing laser scanner data 29, including a plurality of local point-cloud data 21 produced by laser scanner 15, and relatively low-precision positioning data 33 of the scanner 11.
  Obtaining external medium-precision positioning data 37 and internal medium-precision positioning data 35 associated with each of the plurality of local point-cloud data.
  Creating a relatively medium-precision collective point-cloud data 41 from the plurality of local point-cloud data 21.
  Creating a relatively high-precision collective point-cloud data 44 from the medium precision collective point-cloud data 41.

The low-precision positioning data 33 preferably includes any of X, Y, Z coordinates, and yaw angle of the scanner 11 when providing the local point-cloud data 21.

The step of creating a medium-precision collective point-cloud data 41 preferably includes obtaining medium-precision data for the low-precision values of X, Y, Z and Yaw associated with the local point-cloud data 21.

The external medium-precision positioning data 37 preferably includes digital elevation model (DEM) 39, enabling procedure 40 to calculate medium-precision z value for any of the local point-cloud data 21 by calculating Z value from the DEM data.

Reference is now made to FIG. 3, which is a simplified block diagram of procedure 28 for collecting scanner data, according to an embodiment of the present invention.

As shown in FIG. 3, procedure 28 preferably includes the following main steps:
  Step 51 collects laser scanner 29 data including plurality local point-cloud data 21.
  Step 52 collects plurality of high-precision inclination data 30, each associated with a local point-cloud data 21.
  Steps 53 and 54 collect medium-precision positioning data 35 including imaging data 24 and optionally also orientation data 31.
  Step 55 collects scanner low-precision local positioning data 33

Preferably, scanner 11 and procedure 28 execute steps 51, 52, 53, 54 and 55 substantially simultaneously, that is, typically with no motion of scanner 11 until all of local point-cloud data 21 as well as its respective inclination data 30, orientation data 31, imaging data 24, and local positioning data 33 are collected.

Reference is now made to FIG. 4, which is a simplified block diagram of procedure 40 for creating medium-precision collective point-cloud, according to an embodiment of the present invention.

The goal of procedure 40 is to collect the plurality of local point-cloud data 21 obtained in procedure 28 into a medium-precision global point-cloud data 41. This medium-precision global point-cloud data 41 will serve in procedure 43 as the basis for creating a high-precision global point-cloud data 44. To align the plurality of local point-cloud data 21 into the medium-precision global point-cloud data 41 procedure 40 uses the plurality of imaging data 24 collected by procedure 28, the global orthophoto data 38 collected by procedure 36, route tracking devices and other data such as orientation data 31 and inclination data 30 as well as low-precision positioning (GPS) data 33.

Procedure 40 preferably starts with step 56 to convert the plurality of imaging data 24 into local orthophoto data 57. The imaging data 24 contains the image of the ground near the scanner 11 taken in an oblique view. The local orthophoto data 57 is based on the transformation of the oblique view into a nadir view preferably based on the laser scanner data 29 and/or point clouds 21, the inclination data 30 and optionally also on the X, Y data 32 and/or orientation data 31. The X, Y, and yaw angle α are considered low-precision values and therefore this step produces low-precision collective local orthophoto data.

Procedure 40 preferably proceeds with step 58 to align local orthophoto data 57 over global orthophoto data 38. At first, in step 59, the low-precision positioning data 33 and the orientation data 31 collected by procedure 28 for each local orthophoto data 57 are used to place each local orthophoto data 57 over the global orthophoto data 38. Since global orthophoto data is considered medium-precision data, such alignment improves X, Y values of the scanner 11 and yaw angle α of the scanner 11 to medium-precision values.

Reference is now made to FIG. 5, FIG. 6, FIG. 7, FIG. 8, and FIG. 9, which are simplified illustrations of a global orthophoto data 38 and two local orthophoto data 60, according to an embodiment of the present invention.

Figure 5:
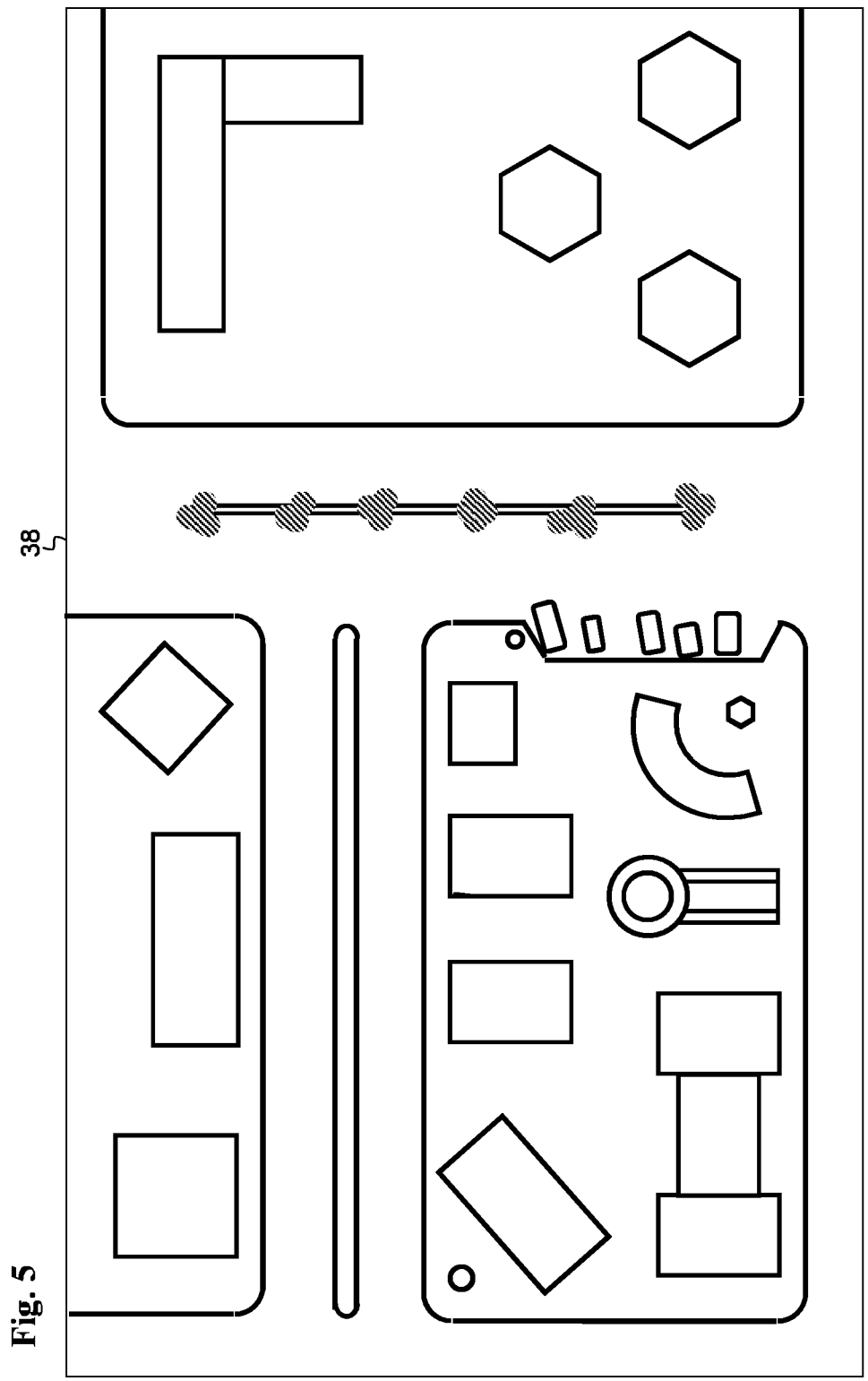
FIG. 5 is a simplified illustration of a global orthophoto data as received

FIG. 5 shows global orthophoto 38 as received by procedure 36. FIG. 6 and FIG. 7 show two local orthophotos 60 designated by numerals 61 and 62, preferably converted from imaging data 24 collected by scanner 11 and procedure 28.

Figure 8:
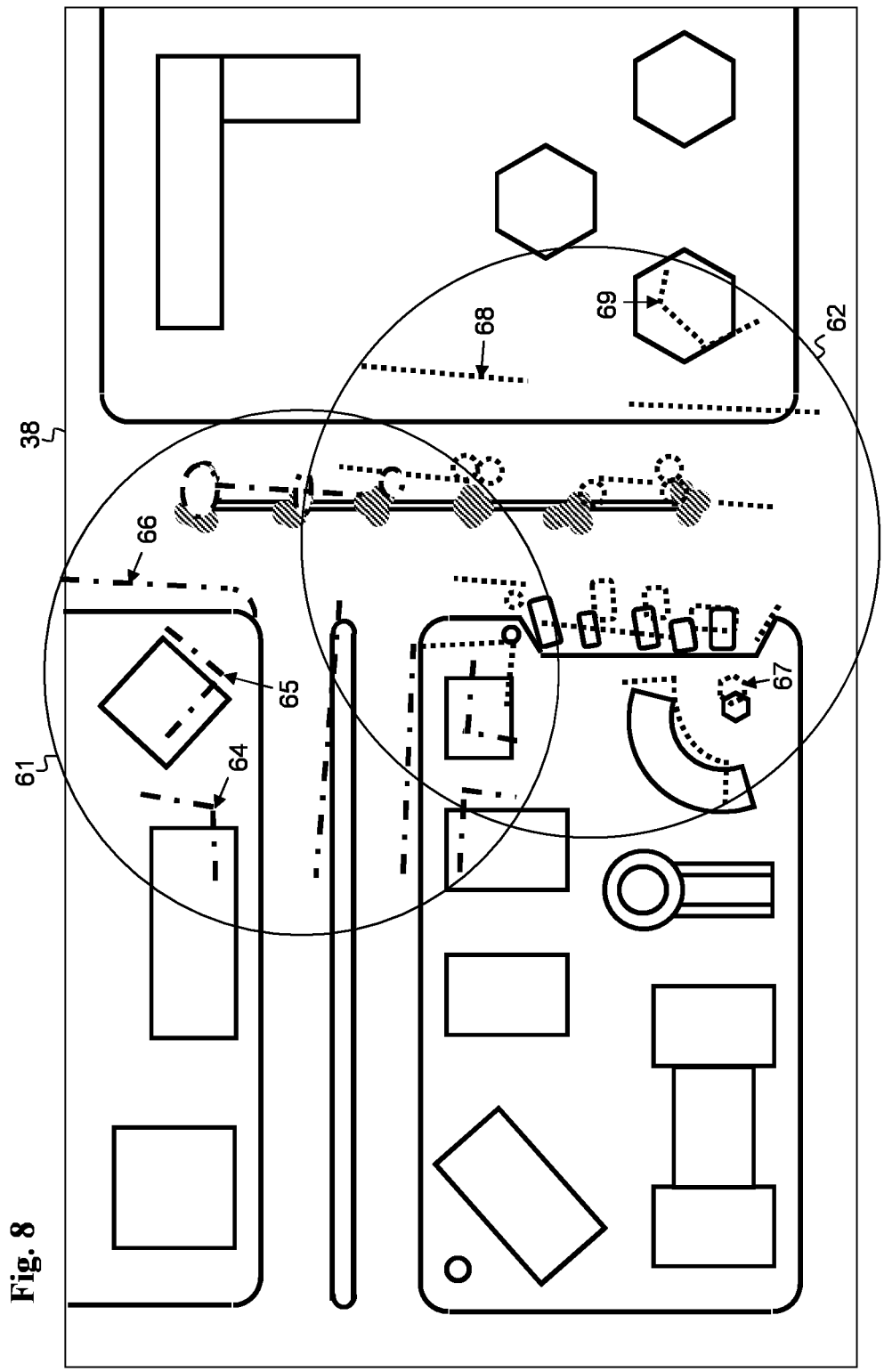
FIG. 8 is a simplified illustration of low-precision positioning of the two local orthophotos over a global orthophoto.

FIG. 8 shows local orthophotos 61 and 62 positioned over global orthophoto 38 using the X and Y coordinates and the yaw angle, which are part of scanner positioning data 33 and orientation data 31 collected with local orthophotos 61 and 62 by scanner 11 and procedure 28. The initial positioning of local orthophotos 61 and 62 over global orthophoto 38 as shown in FIG. 8 is considered low-precision local orthophoto positioning as it is based on low-precision positioning data.

Figure 9:
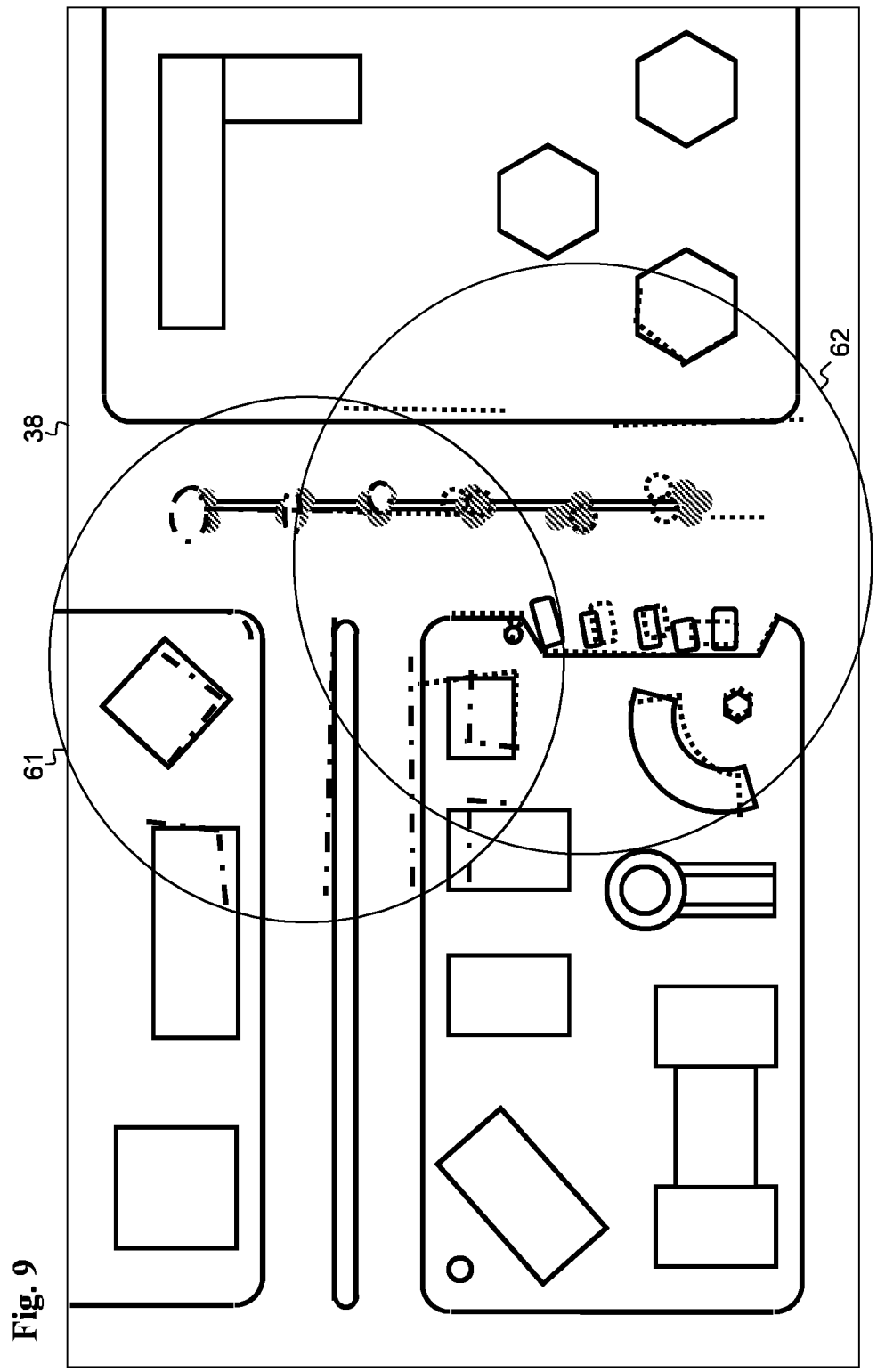
FIG. 9 is a simplified illustration of medium precision local orthophoto positioning.

FIG. 9 shows medium precision local orthophoto positioning.

Returning to FIG. 4, procedure 40 preferably proceeds with step 63 to identify and/or select features of the local orthophotos 60 and 62 (local orthophoto features) that are associated with similar features of global orthophoto 38 (global orthophoto features). Such features are designated in FIG. 8 by numerals 64, 65, 66, 67, 68 and 69 (FIG. 8 designates local orthophoto features).

Procedure 40 then preferably proceeds with step 70, using the relative locations of the features identified and/or selected in step 63, to align local orthophotos 61 and 62 with global orthophoto 38 by moving and/or rotating local orthophotos 61 and 62 either automatically or through user interaction via procedure 42, so as to create the "best" fit of the corresponding features identified and/or selected in step 63, thus providing medium-precision local orthophoto alignment shown in FIG. 9.

Procedure 40 then preferably proceeds with step 71, using inclination data 30, and DEM data 39, to position the local point-cloud data 29 according to the current position of its respective local orthophoto 57, Z value obtained from the DEM and the respective inclination data 30. In step 72 procedure 40 creates a collective medium-precision point-cloud data 41 from a plurality of the local point-cloud data 29 collected by scanner 11.

Steps 63 and 70 of procedure 40 may involve user interaction via procedure 42 to identify and/or select preferred matching orthopohto features such as features 64-69 of FIG. 8, and/or for manipulating, translating, rotating, and orienting the point-cloud data 41 to match the positioning data 34 as shown in FIG. 9.

Reference is now made to FIG. 10A and FIG. 10B, which are simplified illustrations of a point cloud 21 with a point cloud feature 73, according to an embodiment of the present invention.

As shown in FIG. 10A, point cloud 21 contains a plurality of laser scan points 22. Some of these laser scan points 22 designated by numeral 74 are considered to correspond to a certain physical feature of the scanned object. This group of cloud points 74 define cloud feature 73. FIG. 10B shows cloud feature 73 apart from point cloud 21 for better visibility.

Preferably but not exclusively, at least one of the cloud features 73 is a planar patch. A planar patch may typically be a plane that is best described by a group of points 22. Cloud feature 73 of FIG. 10A and FIG. 10B is preferably a planar patch. A planar patch has a normal 75, which is perpendicular to the plane of the patch.

Figure 14:
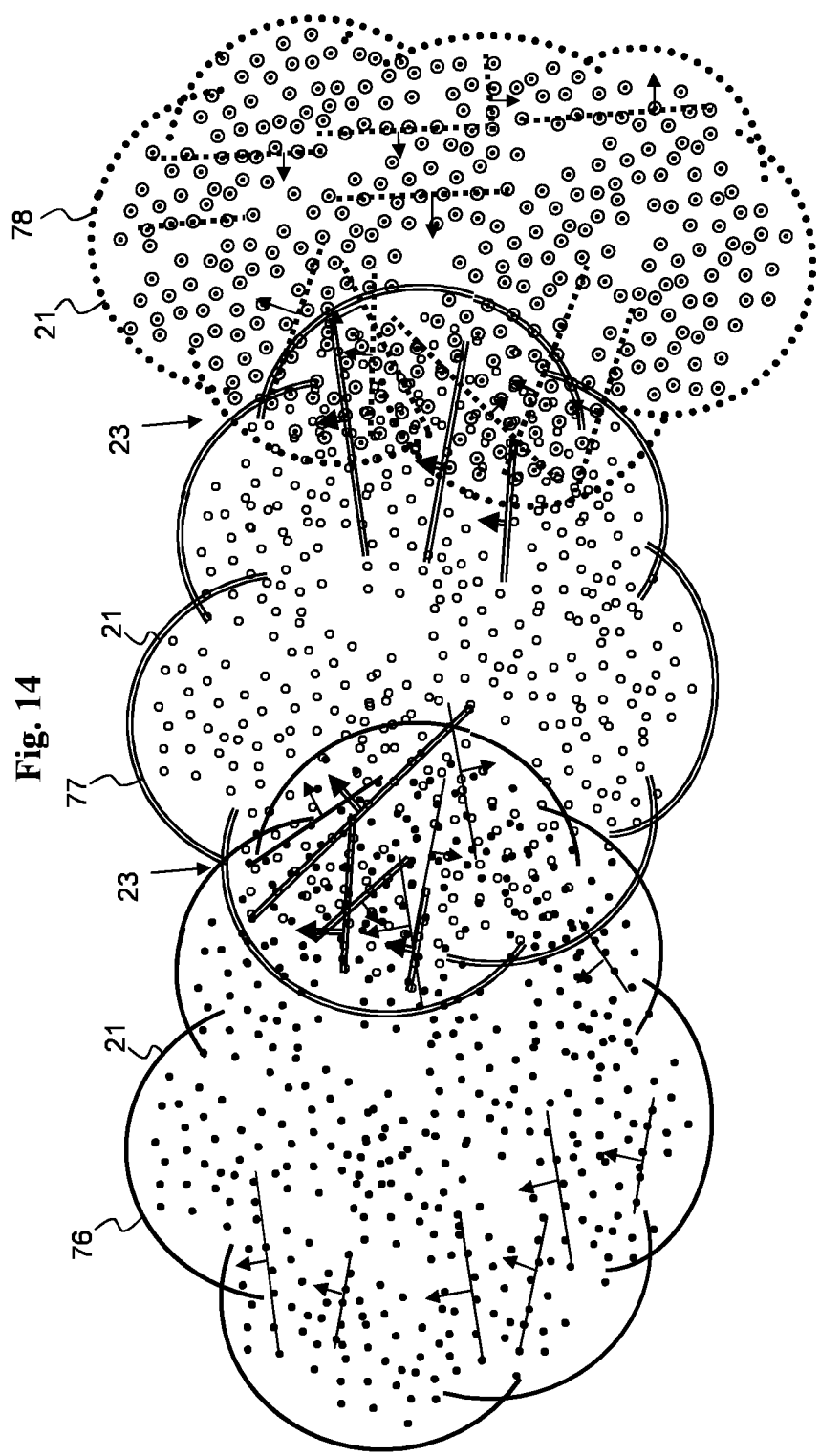
FIG. 14 is a simplified illustration of a medium-precision alignment of the three point clouds.

Reference is now made to FIG. 11, FIG. 12, and FIG. 13, which are simplified illustrations of three point clouds 21, to FIG. 14, which is a simplified illustration of a medium-precision alignment of three point clouds 21, to FIG. 15, which is a simplified illustration of a high-precision alignment of three point clouds 21, and to FIG. 16, which is a simplified illustration of selected point cloud features of three point clouds, all according to an embodiment of the present invention.

It is appreciated that FIG. 14 is a simplified representation of a detail of medium-precision collective point-cloud data 41, and that FIG. 15 is a simplified representation of a detail of high-precision collective point-cloud data 44.

FIG. 11, FIG. 12, and FIG. 13 show three point clouds 21 designated by numerals 76, 77 and 78, respectively, as well as their respective cloud features 73.

Reference is now made to FIG. 17, which is a simplified block diagram of software procedure 43 for creating high-precision collective point-cloud data 44, according to an embodiment of the present invention.

As shown in FIG. 17, procedure 43 preferably starts in step 79 by receiving a plurality of local point-cloud data 21. Procedure 43 preferably proceeds in step 80 by extracting at least one cloud feature 73 from each local point-cloud 21, such as shown and described with reference to FIG. 10A and FIG. 10B. The extraction of cloud features 73 is preferably an automatic process that identifies planar patches, however, user interaction 45 is optionally enabled. Step 80 preferably creates a new data object 81 including the local point-cloud 21 and the cloud features 73. Step 80 repeats to create a plurality of data objects 81 for the plurality of point-cloud data 21, preferably each with a plurality of its cloud features 73. Such plurality of point-cloud data 21, and their respective plurality of cloud features 73 are shown in FIG. 11, FIG. 12, and FIG. 13.

Procedure 43 preferably proceeds in step 82 to match two or more cloud feature 73 of two or more local point-clouds 21. As seen in FIG. 14, local point-clouds 21 and their respective cloud features 73 are preferably positioned based on collective medium-precision location created by procedure 40, as shown and described with reference to FIG. 2 and FIG. 3

Step 82 preferably creates a new data object 83 including the local point-cloud 21 and matched cloud features 73. Step 82 repeats to create a plurality of data objects 83 for the plurality of pairs of point-cloud data 21. FIG. 14 is a graphical representation of an example of the collection of data objects 83 referring to point-clouds 76, 77, 78 and their respective cloud features.

Procedure 43 preferably proceeds in step 84 to determine spatial information affecting relative location of plurality of point-cloud data 21 based on the matched cloud features 73 of data objects 83. FIG. 15 shows an example of data objects 83 containing point-clouds 76, 77, 78 and their respective matched pairs of cloud features 73. Step 84 preferably determines spatial transformation that affects relative transformations to point-clouds 76, 77, 78 so as to create the best fit of matching pairs of cloud features 73 as shown in FIG. 16.

Such transformations preferably include rotations and translations of at least one of the plurality of local point-clouds 21. By applying these transformations, step 84 aligns the features of a local point-cloud 21 with the matching features of a second local point-cloud 21 and affects the location of the point-cloud data 21. Thus, procedure 43 and step 84 create a high-precision collective point-cloud data 44.

Therefore, procedure 43 preferably includes a step of matching cloud features by finding a group of features containing at least one cloud feature from a first local point-cloud and at least one cloud feature from a second local point-clouds; and then affecting the relative location, which includes finding a relative transformation that minimizes spatial distances between the cloud features from the first local point-cloud in the group and the cloud features in the second local point-clouds in the group. This step of grouping the cloud features preferably includes features that are close according to the medium-precision collective point-cloud data. Additionally or alternatively, the step of grouping the features includes cloud features that are planar patches that have a similar normal vector.

Reference is now made to FIG. 18, which is a simplified block diagram of procedure 82 for grouping and matching cloud features 73 according to an embodiment of the present invention.

Procedure 82 is shown and described above with reference to FIG. 17. Cloud features 73 are shown and described above with reference to FIG. 10A and FIG. 10B. Procedure 82 is preferably operative to select cloud features 73 for aligning a pair of local point-clouds 21 as shown and described above with reference to FIG. 11 to FIG. 16. Procedure 82 preferably includes the following steps:

Step 85: For each of the local point-clouds, selecting an array including a plurality of cloud points. Preferably, the array includes N by M points, preferably N=M, preferably N=M=11, alternatively, preferably N=M=22.

Step 86: For each array, selecting three points within the array, the three points defining a planar feature, preferably a plane.

Step 87: For each array, selecting a plurality of plane points within the array, the plane points being within a predetermined distance from the plane (thus defining a planar patch), preferably using the RANdom SAmple Consensus (RANSAC) method.

Step 88: For each array, repeating steps 86 and 87 creating a plurality of planes (planar patches).

Step 89: For each array, selecting the "best"-plane from the plurality of planes, the "best"-plane being the best representation of the points of the array. Such best planes preferably defining cloud features 73.

Reference is now made to FIG. 19, which is a simplified flow diagram of procedure 48, according to an embodiment of the present invention.

Procedure 48, discussed above in reference to FIG. 2, preferably creates a geo-referenced high-precision collective point-cloud data 49. Procedure 48 preferably locks and/or links and/or associates the high-precision collective point-cloud data 45 to the high-precision positioning data 47 so that the collective point-cloud becomes geo-referenced in respect to a particular geodetic system (e.g. the world geodetic system).

As seen in FIG. 19, procedure 48 preferably starts with step 90 to receive selected GPS data points preferably provided as high-precision positioning data 47. Procedure 48 preferably proceeds with step 91 to receive high-precision collective point-cloud data 44 and preferably treats it as a rigid body (single block of point-cloud data).

Procedure 48 preferably proceeds with step 92 to identify the scanner locations in the collective point cloud data 44, that are associated with the selected GPS data points provided by high-precision positioning data 47, to form selected scanner locations.

Procedure 48 preferably proceeds with step 93 to align few scanner locations, typically 3 ("a triplet") with their GPS data while moving the point cloud as a rigid body. In this step procedure 48 selects these GPS scanner locations (a triplet) and then changes the X, Y, Z, roll, pitch, and yaw of the collective point cloud 44 (treated as a single block) so that it best matches the GPS positioning data 47 of the triplet.

Procedure 48 preferably proceeds with step 94 to count the scanner locations that are accurate according a predetermined threshold. For example, the number of the scanner locations which are distanced less than a predetermined distance (such as 0.40 meter) from their respective GPS positioning data (as provided by GPS positioning data 47). The scanner locations that are accurate according the predetermined threshold form a set of "participating locations".

Procedure 48 preferably repeats steps 93 and 94 for all triplets (step 95). Alternatively, procedure 48 uses RANSAC by selecting triplets randomly and repeating the process for a number of times which is adequate statistically.

Procedure 48 preferably proceeds with step 96 to select the triplet with the largest count of influencing locations. Procedure 48 preferably proceeds to step 97 to re-align the collective point cloud 44, as a rigid body, according to all the participating locations of the selected triplet.

Reference is now made to FIG. 20, which is a simplified block diagram of a process 98 for optimizing a cost function, according to an embodiment of the present invention.

The process described above with regard to software program 27, and particularly regarding process 43, can be described as optimizing a cost function for fusing a plurality of local point-clouds 21. This process preferably including the steps of:

Step 99: Providing an initial alignment (medium-precision alignment) of a plurality of local point-clouds, where each of the local point-clouds describes at least one physical element in a local volume, and where each of the local point-clouds comprises a partially overlapping volume with another local point-cloud. This step preferably uses the process of local orthophoto alignment described above with reference to FIG. 1 to FIG. 9.

Step 100: Providing a plurality of plane point groups for each of the local point-clouds 21. These plane point groups are synonymous with the best planes of procedure 89 and this step preferably includes process 82 shown and described with reference to FIG. 17 and FIG. 18.

Step 101: For each overlapping volume, for each local point-cloud within the overlapping volume, selecting a group of associated plane point groups and with the cloud features 73 of FIG. 10A to FIG. 16. Preferably, this step includes selecting a group of associated plane point groups where each of the point groups has a normal, and the normals differ by less than a predetermined normal similarity value, preferably not higher than 5 degrees.

Step 102: Selecting a group of overlapping plane point groups, where each overlapping plane point group overlaps at least one associated plane point group of another local point-cloud 21. This step preferably includes selecting a group of overlapping plane point groups, each having a normal, and where the normal differs from the normal of a plane point groups of another local point-cloud 21 by less than a predetermined allowed spatial distance. The allowed distance is preferably associated with the root-mean-square (RMS) error of the laser scanner 15 providing the local point-cloud 21, and preferably not more than twice the RMS.

Step 103: Aligning the plurality of point clouds 21 so that the number of overlapping plane point groups is maximal.

It is appreciated that only relations in which approximately 50% (in some cases 30%) of the planar patches (e.g. plane point groups, or cloud feature) are consistent and considered. Other possible pair of scans may be ignored as it is difficult to determine their relative transformation in a significant enough manner.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for creating a collective point-cloud data from a plurality of local point-cloud data, the method comprising the steps of:
    providing scanner data comprising said plurality of local point-cloud data, wherein said local point-cloud data comprises relatively low-precision positioning data of said scanner;
    creating a relatively medium-precision collective point-cloud data from said plurality of local point-cloud data; and
    creating a relatively high-precision collective point-cloud data from said medium-precision collective point-cloud data;
    wherein said step of creating a medium-precision collective point-cloud data comprises providing external (medium-precision) positioning data associated with each of said plurality of local point-cloud data.

2. The method of claim 1 wherein said low-precision positioning data comprises at least one of X, Y, Z coordinates, and yaw angle of a scanner providing said local point-cloud data; and
    wherein said step of creating a medium-precision collective point-cloud data comprises obtaining medium-precision data for at least one of said x, y, z coordinates, and yaw angle of said local point-cloud data.

3. The method of claim 2 wherein said external (medium-precision) positioning data comprises digital elevation model (DEM) and wherein said step of calculating medium-precision z coordinate for any of said local point-cloud data comprises using Z value from said DEM data.

4. The method of claim 2 wherein said step of calculating medium-precision for at least one of said x, y, z coordinates, and yaw angle comprises:
    providing a global orthophoto data for said collective point-cloud data;
    providing a local orthophoto data for each of said local point-cloud data;
    aligning each of said local orthophoto data to said global orthophoto data to form a collectively-aligned local-orthophoto data; and
    calculating said medium-precision values for at least one of said X, Y, and yaw for at least one of said local-orthophoto data based on said alignment of said local point-cloud data to said global orthophoto data.

5. The method of claim 4 wherein said step of providing said local orthophoto data comprises the steps of:
    providing image data comprising of at least one of a ground image and a ceiling image, said image data associated with each of said local point-cloud data; and
    converting said image data into a local orthophoto data.

6. The method of claim 2 wherein said step of aligning said local orthophoto data comprises the steps of:
    providing inclination data to form roll and pitch values of said scanner providing said local point-cloud data for at least one of said local orthophoto data; and
    using said roll and pitch values as medium-precision values of at least one of said local orthophoto data and said local point-cloud.

7. The method of claim 1 wherein said step creating a medium-precision collective point-cloud data comprises:
    providing a global orthophoto data for said collective point-cloud data;
    providing a local orthophoto data for said scanner when scanning said local point-cloud data;
    aligning each of said local orthophoto data to said global orthophoto data; and
    aligning said local point-cloud data, using said alignment of said local-orthophoto data to form said medium-precision collective point cloud data.

8. The method of claim 7 wherein said step of aligning said local orthophoto data comprises the steps of
    obtaining a global digital elevation model (DEM) data associated with at least one of said global orthophoto and said collective point-cloud data; and
    obtaining z value from said DEM data for at least one of said global orthophoto data and said local-orthophoto data.

9. The method of claim 7 wherein said step of aligning said local orthophoto data comprises the steps of:
    providing inclination data to form roll and pitch values of said scanner providing said local point-cloud data for at least one of said local orthophoto data; and
    using said roll and pitch values as medium-precision values of at least one of said local orthophoto data and said local point-cloud.

10. The method of claim 1 wherein said step of creating a high-precision collective point-cloud data comprises:
    extracting at least one feature from a first local point-cloud;
    extracting at least one feature from a second local point-cloud;
    matching at least one feature of said first local point-cloud with at least one feature of said second local point-cloud; and
    applying a relative transformation comprising at least one of rotation and translation to at least one of said first and second local point-clouds to align said feature from said first local point-cloud with said feature from said second local point-cloud.

11. The method of claim 10 wherein at least one of said features is a planar patch.

12. The method of claim 10 wherein said step of matching said features comprises finding a group of features comprising at least one feature from said first local point-cloud and at least one feature from said second local point-clouds; and
    wherein said step of applying a relative transformation comprises finding a relative transformation that minimizes distances between said features from said first local point-cloud in said group and said features in said second local point-clouds in said group.

13. The method of claim 10 wherein said step of matching said features comprises features that are close according to said medium-precision collective point-cloud data.

14. The method of claim 10 wherein said step of matching said features comprises planar features that have a similar normal vector.

15. The method of claim 1 additionally comprising a step of:
    geo-referencing said high-precision collective point-cloud data using relatively high-precision external positioning data.

16. The method of claim 15 said step of geo-referencing comprises:
    obtaining said high-precision external positioning data for each of a plurality of said local point-cloud data.

17. The method of claim 15 wherein said high-precision external positioning data comprises global positioning system (GPS) data.

18. The method of claim 17 wherein said step of geo-referencing comprises:
    selecting at least one GPS data according to a criterion selected from a group of criterions comprising:
    GPS data comprising a predetermined minimal number of satellites;
    GPS data comprising a predetermined minimal uninterrupted reception time of a minimal number of satellites; and
    GPS data within a predetermined limit variance from an average of said GPS data.

19. A computer program product, stored on one or more non-transitory computer-readable medium, comprising instructions operative to cause a programmable processor of a network device to perform the steps of claim 1.

20. A method of creating a collective point-cloud data comprising a plurality of local point-clouds, said method comprising the steps of:
    extracting at least one feature from a first local point-cloud;
    extracting at least one feature from a second local point-cloud;
    matching at least one feature of said first local point-cloud with at least one feature of said second local point-cloud; and
    affecting a relative transformation comprising at least one of rotation and translation on at least one of said first and second local point-clouds to align said feature from said first local point-cloud with said feature from said second local point-cloud.

21. The method of claim 20 wherein at least one of said features is a planar patch.

22. The method of claim 20 wherein said step of matching said features comprises finding one or more groups of features, each comprising at least one feature from said first local point-cloud and at least one feature from said second local point-clouds; and
wherein said step of affecting relative transformation comprises finding relative transformation that minimizes distances between said features from said first local point-cloud in each of said group and said features in said second local point-clouds in each of said group.

23. The method of claim 20 wherein said step of matching said features comprises features that are close according to a medium-precision collective point-cloud data.

24. The method of claim 20 wherein said step of matching said features comprises:
    displaying said features to a user; and
    enabling said user to affect at least one of selection and de-selection of features.

25. The method of claim 24 wherein said step of enabling said user to affect at least one of selection and de-selection of features comprises at least one of inclusion or removal of said features from said group.

26. The method of claim 20 wherein said step of matching said features comprises planar features that have a similar normal vector.

27. The methods of claim 20 wherein said step of matching said features comprises:
    using a medium-precision collective point-cloud data,
    setting parameters for determining distance threshold between cloud features,
    displaying said features to a user,
    matching features that are close according to said distance threshold, and
    enabling said user to affect at least one of selection and de-selection of features.

28. The methods of claim 20 additionally comprising the step of:
    setting parameters for determining planar vector similarity,
    wherein said step of matching said features comprises determining planar vector similarity according to said parameter, and
    enabling said user to affect at least one of selection and de-selection of features comprises least one of inclusion or removal of said features from said group based on said vector similarity.

29. A computer program product, stored on one or more non-transitory computer-readable medium, comprising instructions operative to cause a programmable processor of a network device to perform the steps of claim 20.

* * * * *